United States Patent
Codrescu et al.

(10) Patent No.: US 8,370,806 B2
(45) Date of Patent: Feb. 5, 2013

(54) NON-INTRUSIVE, THREAD-SELECTIVE, DEBUGGING METHOD AND SYSTEM FOR A MULTI-THREAD DIGITAL SIGNAL PROCESSOR

(75) Inventors: Lucian Codrescu, Austin, TX (US); William C. Anderson, Austin, TX (US); Suresh Venkumahanti, Austin, TX (US); Louis Achille Giannini, Berwyn, IL (US); Manojkumar Pyla, San Diego, CA (US); Xufeng Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1042 days.

(21) Appl. No.: 11/560,217

(22) Filed: Nov. 15, 2006

(65) Prior Publication Data
US 2008/0115113 A1 May 15, 2008

(51) Int. Cl.
G06F 9/44 (2006.01)
(52) U.S. Cl. .................... 717/124; 717/129; 714/35
(58) Field of Classification Search ......... 717/129, 717/124, 125; 714/35, E11.208, E11.209; 716/50, 137, 138; 712/224, 606
See application file for complete search history.

(56) References Cited

U.S. PATENT DOCUMENTS

| | | | |
|---|---|---|---|
| 4,080,650 A | 3/1978 | Beckett | |
| 4,669,059 A | 5/1987 | Little et al. | |
| 4,901,307 A | 2/1990 | Gilhousen et al. | |
| 5,093,914 A | 3/1992 | Coplien et al. | |
| 5,103,459 A | 4/1992 | Gilhousen et al. | |
| 5,136,717 A | 8/1992 | Morley et al. | |
| 5,544,311 A | 8/1996 | Harenberg et al. | |
| 5,551,043 A | 8/1996 | Crump et al. | |
| 5,944,841 A | 8/1999 | Christie | |
| 5,951,696 A | 9/1999 | Naaseh et al. | |
| 6,018,759 A | 1/2000 | Doing et al. | |
| 6,029,248 A | 2/2000 | Clee et al. | |
| 6,052,708 A | 4/2000 | Flynn et al. | |
| 6,067,588 A | 5/2000 | Ito | |
| 6,106,571 A | 8/2000 | Maxwell | |

(Continued)

FOREIGN PATENT DOCUMENTS

| | | |
|---|---|---|
| EP | 1411434 A2 | 4/2004 |
| JP | 2183362 A | 7/1990 |

(Continued)

OTHER PUBLICATIONS

Jiang, "Enhancing System-on-Chip Verification Using Embedded Test Structures", 2005.*

(Continued)

*Primary Examiner* — Phillip H Nguyen
(74) *Attorney, Agent, or Firm* — Peter M. Kamarchik; Nicholas J. Pauley; Jonathan T. Velasco

(57) ABSTRACT

A method and system provide processing instructions in a multi-threaded process including the use of breakpoint instructions for generating debugging event(s). A debugging event is generated in response to the execution of breakpoint instructions and executes debugging instructions in response to the debugging event. The debugging instructions debug processing instructions in the multi-threaded processor by transitioning at least one or more threads into a debugging mode. A debugging return is generated for reporting the executing debugging instructions in the subset of the threads of the multi-threaded processor.

24 Claims, 5 Drawing Sheets

U.S. PATENT DOCUMENTS

| | | |
|---|---|---|
| 6,199,181 B1 | 3/2001 | Rechef et al. |
| 6,202,172 B1 | 3/2001 | Ponte |
| 6,212,544 B1 | 4/2001 | Borkenhagen et al. |
| 6,226,749 B1 | 5/2001 | Carloganu et al. |
| 6,249,907 B1 * | 6/2001 | Carter et al. ............ 717/129 |
| 6,314,530 B1 | 11/2001 | Mann |
| 6,341,347 B1 | 1/2002 | Joy et al. |
| 6,343,371 B1 | 1/2002 | Flanagan et al. |
| 6,467,054 B1 | 10/2002 | Lenny |
| 6,480,818 B1 * | 11/2002 | Alverson et al. ............ 703/26 |
| 6,532,553 B1 | 3/2003 | Gwilt et al. |
| 6,567,839 B1 | 5/2003 | Borkenhagen et al. |
| 6,665,802 B1 | 12/2003 | Ober |
| 6,684,348 B1 | 1/2004 | Edwards et al. |
| 6,697,935 B1 | 2/2004 | Borkenhagen et al. |
| 6,708,270 B1 | 3/2004 | Mayer |
| 6,714,958 B1 | 3/2004 | Tudor |
| 6,757,829 B1 | 6/2004 | Laczko et al. |
| 6,798,713 B1 | 9/2004 | Yearsley et al. |
| 6,832,334 B2 | 12/2004 | Wojcieszak et al. |
| 6,834,360 B2 | 12/2004 | Corti et al. |
| 6,915,416 B2 | 7/2005 | Deng et al. |
| 6,981,261 B2 | 12/2005 | Kalafatis et al. |
| 7,013,400 B2 | 3/2006 | Kalla et al. |
| 7,020,871 B2 * | 3/2006 | Bernstein et al. ............ 717/129 |
| 7,047,451 B2 | 5/2006 | Agarwala et al. |
| 7,055,139 B2 | 5/2006 | Balle et al. |
| 7,073,059 B2 | 7/2006 | Worely et al. |
| 7,076,804 B2 | 7/2006 | Kershenbaum et al. |
| 7,080,289 B2 | 7/2006 | Swaine et al. |
| 7,093,236 B2 | 8/2006 | Swaine et al. |
| 7,131,114 B2 * | 10/2006 | Nguyen et al. ............ 717/129 |
| 7,185,319 B2 | 2/2007 | Kaler et al. |
| 7,203,926 B2 | 4/2007 | Bogle et al. |
| 7,210,064 B2 | 4/2007 | Mayer |
| 7,213,134 B2 | 5/2007 | Soltis, Jr. et al. |
| 7,222,262 B2 | 5/2007 | Prasadh et al. |
| 7,254,716 B1 | 8/2007 | Giles et al. |
| 7,278,058 B1 | 10/2007 | Narisi |
| 7,318,017 B2 | 1/2008 | Swoboda |
| 7,321,957 B2 | 1/2008 | Khan et al. |
| 7,360,117 B1 * | 4/2008 | Boike et al. ............ 714/34 |
| 7,369,954 B2 | 5/2008 | Levine et al. |
| 7,380,112 B2 | 5/2008 | Okabayashi et al. |
| 7,380,276 B2 | 5/2008 | Saha et al. |
| 7,383,537 B2 | 6/2008 | Darweesh et al. |
| 7,383,540 B2 | 6/2008 | Kalra |
| 7,421,571 B2 | 9/2008 | Shoemaker |
| 7,437,619 B2 | 10/2008 | McCullough et al. |
| 7,461,407 B2 | 12/2008 | Little et al. |
| 7,472,378 B2 | 12/2008 | Bennett et al. |
| 7,475,303 B1 | 1/2009 | Edgar et al. |
| 7,512,954 B2 | 3/2009 | Srivastava et al. |
| 7,577,878 B2 | 8/2009 | Baradie et al. |
| 7,594,146 B2 | 9/2009 | Horikawa et al. |
| 7,600,221 B1 | 10/2009 | Rangachari |
| 7,657,791 B2 | 2/2010 | Codrescu et al. |
| 7,657,875 B2 | 2/2010 | Alexander, III |
| 7,770,155 B2 | 8/2010 | Bates et al. |
| 7,770,156 B2 | 8/2010 | Thekkath |
| 7,823,131 B2 | 10/2010 | Gard et al. |
| 7,890,316 B2 | 2/2011 | Swoboda et al. |
| 7,917,907 B2 | 3/2011 | Ahmed et al. |
| 8,136,097 B2 | 3/2012 | Konishi et al. |
| 8,196,109 B2 | 6/2012 | Fung et al. |
| 8,239,838 B2 | 8/2012 | Yim et al. |
| 2002/0004933 A1 | 1/2002 | Dzoba et al. |
| 2002/0035721 A1 | 3/2002 | Swoboda |
| 2002/0065646 A1 | 5/2002 | Waldie et al. |
| 2002/0099977 A1 | 7/2002 | Wong |
| 2003/0014643 A1 | 1/2003 | Asami et al. |
| 2003/0037226 A1 | 2/2003 | Tsuruta et al. |
| 2003/0061550 A1 | 3/2003 | Ng et al. |
| 2003/0065963 A1 | 4/2003 | Gregg |
| 2003/0074650 A1 | 4/2003 | Akgul et al. |
| 2003/0135720 A1 | 7/2003 | DeWitt, Jr. et al. |
| 2004/0024995 A1 | 2/2004 | Swaine |
| 2004/0103397 A1 | 5/2004 | Agarwala et al. |
| 2004/0103398 A1 | 5/2004 | Agarwala et al. |
| 2004/0105298 A1 | 6/2004 | Symes |
| 2004/0117768 A1 | 6/2004 | Chang et al. |
| 2004/0123274 A1 | 6/2004 | Inagaki et al. |
| 2004/0133823 A1 | 7/2004 | Swoboda et al. |
| 2004/0170046 A1 | 9/2004 | Belnet et al. |
| 2004/0170168 A1 | 9/2004 | Dedek |
| 2004/0177269 A1 | 9/2004 | Belnet et al. |
| 2004/0205747 A1 | 10/2004 | Bernstein et al. |
| 2004/0260910 A1 | 12/2004 | Watt et al. |
| 2005/0034024 A1 | 2/2005 | Alverson et al. |
| 2005/0108689 A1 | 5/2005 | Hooper et al. |
| 2005/0177703 A1 | 8/2005 | Norden et al. |
| 2005/0177819 A1 | 8/2005 | Ober et al. |
| 2005/0188358 A1 | 8/2005 | Johnson et al. |
| 2005/0246691 A1 | 11/2005 | Hsieh et al. |
| 2005/0268168 A1 | 12/2005 | Ishihara |
| 2006/0026594 A1 | 2/2006 | Yoshida et al. |
| 2006/0048099 A1 | 3/2006 | Templin et al. |
| 2006/0069953 A1 | 3/2006 | Lippett et al. |
| 2006/0129999 A1 | 6/2006 | Hiraoka et al. |
| 2006/0179281 A1 | 8/2006 | Jensen et al. |
| 2006/0184835 A1 | 8/2006 | Al-Omari et al. |
| 2006/0206902 A1 | 9/2006 | Jamil et al. |
| 2006/0212759 A1 | 9/2006 | Campbell et al. |
| 2006/0248394 A1 | 11/2006 | McGowan |
| 2006/0248395 A1 | 11/2006 | McGowan |
| 2006/0248401 A1 | 11/2006 | Carroll et al. |
| 2006/0253894 A1 | 11/2006 | Bookman et al. |
| 2006/0259831 A1 | 11/2006 | Sohm et al. |
| 2006/0279439 A1 | 12/2006 | Swoboda |
| 2006/0282419 A1 | 12/2006 | Sen et al. |
| 2006/0282734 A1 | 12/2006 | Milne et al. |
| 2007/0016959 A1 | 1/2007 | Ikeda et al. |
| 2007/0043861 A1 | 2/2007 | Baron et al. |
| 2007/0089095 A1 | 4/2007 | Thekkath et al. |
| 2007/0180333 A1 | 8/2007 | Thekkath et al. |
| 2007/0180431 A1 | 8/2007 | Agarwala et al. |
| 2007/0220360 A1 | 9/2007 | Weinert et al. |
| 2007/0234306 A1 | 10/2007 | Klinger et al. |
| 2007/0240125 A1 | 10/2007 | Degenhardt et al. |
| 2007/0271461 A1 | 11/2007 | Hardy et al. |
| 2007/0288906 A1 | 12/2007 | Agarwala et al. |
| 2008/0010640 A1 | 1/2008 | Foo |
| 2008/0027961 A1 | 1/2008 | Arlitt |
| 2008/0028196 A1 | 1/2008 | Kailas |
| 2008/0034350 A1 | 2/2008 | Conti |
| 2008/0052681 A1 | 2/2008 | Yang |
| 2008/0059963 A1 | 3/2008 | Foo |
| 2008/0080651 A1 | 4/2008 | Edgar |
| 2008/0098207 A1 | 4/2008 | Reid et al. |
| 2008/0114972 A1 | 5/2008 | Codrescu et al. |
| 2008/0115011 A1 | 5/2008 | Codrescu et al. |
| 2008/0115115 A1 | 5/2008 | Codrescu et al. |
| 2008/0209176 A1 | 8/2008 | Singh et al. |
| 2008/0256339 A1 | 10/2008 | Xu et al. |
| 2008/0256396 A1 | 10/2008 | Giannini et al. |
| 2008/0288808 A1 | 11/2008 | Moyer |
| 2009/0007076 A1 | 1/2009 | Al-Omari et al. |
| 2009/0132863 A1 | 5/2009 | Ashfield et al. |
| 2009/0199162 A1 | 8/2009 | Choi et al. |

FOREIGN PATENT DOCUMENTS

| | | |
|---|---|---|
| JP | 04145544 | 5/1992 |
| JP | 8055023 A | 2/1996 |
| JP | 08087366 A | 4/1996 |
| JP | 09167105 A | 6/1997 |
| JP | 2001154873 A | 6/2001 |
| JP | 2001519947 A | 10/2001 |
| JP | 2001331340 A | 11/2001 |
| JP | 2001521215 T | 11/2001 |
| JP | 2003177938 A | 6/2003 |
| JP | 2004171563 A | 6/2004 |
| JP | 2004171564 A | 6/2004 |
| JP | 2006285430 A | 10/2006 |
| KR | 20010031167 | 4/2001 |
| KR | 20060049710 | 5/2006 |
| TW | 200625070 | 7/2006 |
| WO | WO9921089 | 4/1999 |

| | | |
|---|---|---|
| WO | WO0068780 | 11/2000 |
| WO | WO01/18651 | 3/2001 |
| WO | WO2006030195 | 3/2006 |

OTHER PUBLICATIONS

Bermeulen et al., "Core-Based Scan Architecture for Silicon Debug", 2002.*

Vermeulen et al., "Silicon Debug of a Co-Processor Array for Video Applications", 2000.*

Rootselaar et al., "Debugging of Systems-on-a-Chip", 1997.*

Andrews et al, "Xbox 360 System Architecture", 2006.*

Hartvigsen, J., et al.; "JTAG/DEBUG Interface"; Motorola Technical Developments, Motorola Inc.; Schaumburg, Illinois, US; vol. 19, Jun. 1, 1993; pp. 107-109; XP000361499; ISSN: 0887-5286.

"Processor-Controlled Battery Back-Up Power Supply Architecture" IBM Technical Disclosure Bulletin, IBM Corp. New York, US, vol. 31, No. 3, (Jan. 8, 1988), p. 183-185, XP000119002, ISSN: 0018-8689.

"Technique for Power Management in Signal Processors" IBM Technical Disclosure Bulletin, IBM Corp. New York, US, vol. 35, No. 5, (Oct. 1, 1992), p. 425-427, XP000313036.

ETSI TS 125.305 v 6.1.0: "Universal Mobile Telecommunications Systems (UMTS)," European Telecommunications Standard Institute, France, (Jun. 1, 2004), XP014016761.

International Search Report and Written Opinion—PCT/US07/084456, International Seach Authority—European Patent Office—May 28, 2008.

Microsoft Press Computer Dictionary, Third Edition, "operating system," Microsoft Press (Aug. 1, 1997), ISBN 1-57231-446-X, p. 341.

Qian, Y, et. al.: "Cycle accurate thread timer for linux environment" Performance Analysis of Systems and Software, 2001. ISPASS, 2001 IEEE International Symposium on Nov. 4-6, 2001, Piscataway, NJ, USA, IEEE, Nov. 4, 2001, pp. 38-44, XPOI0583886 ISBN: 978-0-7695-7230-7.

Wu, C. et al.: "Trace-based analysis and tuning for distributed parallel applications" Parallel and Distributed Systems, 1994. International Conference on Hsinchu, Taiwan Dec. 19-21, 1994, Los Alamitos, CA, USA, IEEE Comput. Soc, Dec. 19, 1994, pp. 716-723, XPOI0223604 ISBN: 978-0-8186-6555-4.

ARM Limited, Embedded Trace Macrocell 9—Technical Reference Manual, 2002, 164 pages, <http://rtds.cs.tamu.edu/web_462/techdocs/ARM/debug/DDI0157F_ETM9_r2p2.pdf>.

Blair Fort, et al., "A Multithreaded Soft Processor for SOPC Area Reduction", IEEE International Symposium on Custom Computing Machines, Napa, CA, Oct. 2006, IEEE computer society, pp. 131-142.

Compan et al., GENVIEW: A Portable Source-Level Debugger for Macrocell Generators, 1991, 5 pages, <http://ieeexplore.ieee.org/stamp/stamp.jsp?tp=&arnumber=206436&userType=inst>.

Kreuzinger J, et al: "Context-Switching Techniques for Decoupled Multithreaded Processors" Euromicroconference, 1999, Proceedings. 25th Milan, Italy Sept. 8-10, 1999, Los Alamitos, CA, USA, IEEE Comput, Soc, US, Vol. 1, (Sep. 8, 1999), pp. 248-251.

Mayer et al., Debug support, Clibration and Emulation for Multiple Processor and Powertrain Control SoCs, 2005, 5 pages, <http://ieeexplore.ieee.org/stamp/stamp.jsp?arnumber=01395811>.

Ungerer Theo, "A Survey of Processors With Explicit Multithreading, Mar. 2003 (29-63)," ACM Computing Survey, 2003, 35 (1).

Camera et al.,"An integrated debugging environment for reprogrammable hardware systems", Sep. 2005, pp. 111-115, <http://delivery.acm.org/1 0.1145/1090000/1085145/p111-camera.pdf>.

Vermeulen et al." Automatic generation of breakpoint hardware for silicon debug", Jun. 2004, pp. 514-517,<http://delivery.acm.org/1 0.1145/1 000000/996708/p514-vermeulen.pdf>.

* cited by examiner

NON-INTRUSIVE, THREAD-SELECTIVE, DEBUGGING METHOD AND SYSTEM FOR A MULTI-THREAD DIGITAL SIGNAL PROCESSOR

RELATED APPLICATIONS

This application is related to the following U.S. patent application Ser. No. 11/560,323, now U.S. Pat. No. 7,657,791, filed Nov. 15, 2006 and entitled METHOD AND SYSTEM FOR A DIGITAL SIGNAL PROCESSOR DEBUGGING DURING POWER TRANSITIONS: U.S. patent application Ser. No. 11/560,332, filed Nov. 15, 2006 and entitled METHOD AND SYSTEM FOR TRUSTED/UNTRUSTED DIGITAL SIGNAL PROCESSOR DEBUGGING OPERATIONS; U.S. patent application Ser. No. 11/560,339, filed Nov. 15, 2006 and entitled EMBEDDED TRACE MACROCELL FOR ENHANCED DIGITAL SIGNAL PROCESSOR DEBUGGING OPERATIONS; and U.S. patent application Ser. No. 11/560,344, filed Nov. 15, 2006 and entitled METHOD AND SYSTEM FOR INSTRUCTION STUFFING OPERATIONS DURING NON-INTRUSIVE DIGITAL SIGNAL PROCESSOR DEBUGGING.

FIELD

The disclosed subject matter relates to data communications. More particularly, this disclosure relates to a novel and improved non-intrusive, thread-selective, debugging method and system for a multi-threaded digital signal processor.

DESCRIPTION OF THE RELATED ART

Increasingly, telecommunications and other types of electronic equipment and supporting video, complex audio, videoconferencing and other rich software applications involve signal processing. Signal processing requires fast mathematical calculations and data generation in complex, but repetitive algorithms. Many applications require computations in real-time, i.e., the signal is a continuous function of time, which must be sampled and converted to digital signals for numerical processing. The processor must execute algorithms performing discrete computations on the samples as they arrive. The architecture of a digital signal processor (DSP) is optimized to handle such algorithms. The characteristics of a good signal processing engine include fast, flexible arithmetic computation units, unconstrained data flow to and from the computation units, extended precision and dynamic range in the computation units, dual address generators, efficient program sequencing, and ease of programming.

One promising application of DSP technology includes communications systems such as a code division multiple access (CDMA) system that supports voice and data communication between users over a satellite or terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more standards. One such first generation standard is the "TIA/EIA/IS-95 Terminal-Base Station Compatibility Standard for Dual-Mode Wideband Spread Spectrum Cellular System," hereinafter referred to as the IS-95 standard. The IS-95 CDMA systems are able to transmit voice data and packet data. A newer generation standard that may more efficiently transmit packet data is offered by a consortium named the "3 Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA Standard.

Complex DSP operational software employing the W-DCMA Standard, for example, requires robust development tools. Such development tools may include those for code generation, integration, testing, debugging, and evaluating application performance. In developing and operating software or complex DSP applications, such as advanced telecommunications applications, there is the need for sophisticated, yet non-intrusive debugging software. That is, debugging software applications must be not only sufficiently robust to monitor, test, and support the correction of software defects and operational problems, but also they may operate so as not to interfere with the core processor software during debugging operations. Otherwise, any problems in the core processing software may not be detected or detected properly during the use of such debugging software.

For example, cycle-accurate profiling and non-intrusive debugging features are critical for optimizing and debugging real-time video software. Also, development boards need support for moving large quantities of test data into and out of the processor to enable extensive real-time testing. These and other situations require non-intrusive core processor software debugging. So, in a multi-threaded digital signal processor there is the need to debug multi-threaded operating software in a way that is non-intrusive. Moreover, in an environment were there is real-time operating software, any change in the software that an intrusive debugging program may cause may unequivocally change what occurs in the processor, much to the detriment of both determining software operational problems, as well as any necessary debugging operations.

From the above, it becomes clear that there is the need for DSP debugging processes that may operate interactively and yet non-intrusively to the real-time behavior of the multi-threaded digital signal processor.

In a multi-threaded DSP, interactions between one or more threads may also cause core processor malfunctions. This may be true, although individual threads may operate individually as programmed and desired. Also, different combinations of operating threads may cause still different types of programming problems for which debugging software analysis is beneficial.

Furthermore, in a multi-threaded DSP there may be many points, i.e., breakpoints at which debugging operations are desired. Such breakpoints may arise due to hardware conditions, software conditions, external conditions, and other conditions affecting the core processor applications. A flexible type of multi-threaded DSP debugging software application would preferably accommodate a wide variety of conditions that call for core processor application debugging. In fact, flexibility may mandate that the debugging software vary, even dynamically, according to those conditions that call into operation the debugging software.

With these considerations in mind, it is clear that a need exists for a multi-threaded DSP debugging process that supports debugging individual threads.

A need also exists for multi-threaded DSP debugging processes that permit thread-selective debugging operations of one, two, or more threads according to needs of the core processing applications.

A need yet exists for a method and system that permits a multi-threaded DSP to engage a debugging process with a wide variety of conditions affecting DSP operation, including, for example, hardware conditions, software conditions, external conditions, and other conditions for which debugging breakpoints may be established.

SUMMARY

Techniques for providing non-intrusive, thread-selective, debugging method and system for a multi-threaded digital signal processor are disclosed, which techniques improve both the operation of a digital signal processor and the efficient use of digital signal processor instructions for increasingly powerful software applications including applications operating in personal computers, personal digital assistants, wireless handsets, and similar electronic devices, as well as increasing the associated digital processor speed and service quality.

According to one aspect of the disclosed subject matter, there is provided a method and system non-intrusive debugging of a multi-threaded digital signal processor. The method and system allow storing debugging instructions in a first set of registers and storing processing instructions in a second set of registers. The second set of registers is distinct from the first set of registers. The method and system further execute processing instructions in a multi-threaded process using at least one or more threads of the multi-threaded digital signal processor. Subsets of the processing instructions are breakpoint instructions for generating at least one debugging event. The process generates at least one debugging event in response to the execution of at least one of the breakpoint instructions and executes debugging instructions in response to the debugging event, the debugging instructions allow non-intrusively debugging the executing of processing instruction in the multi-threaded digital signal processor by transitioning at least one or more threads of the multi-threaded digital signal processor into a debugging mode of operation. The disclosure generates a debugging return from the execution of the plurality of debugging instructions for reporting the executing debugging instructions in the subset of the threads of the multi-threaded digital signal processor.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter may become more apparent from the detailed description set forth below when taken in conjunction with the drawings in which like reference characters identify correspondingly throughout and wherein.

Figure 3:
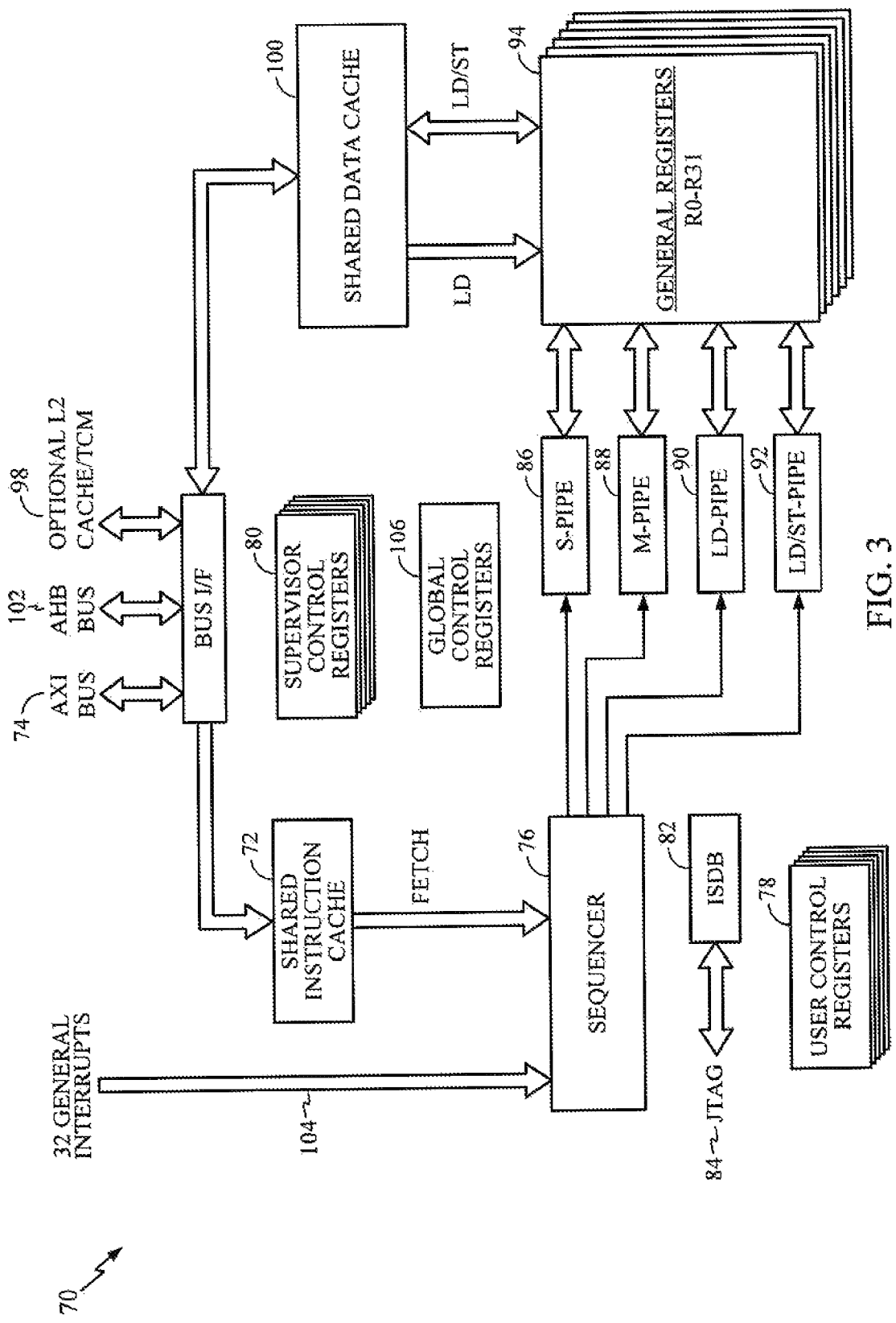
Figure 4:
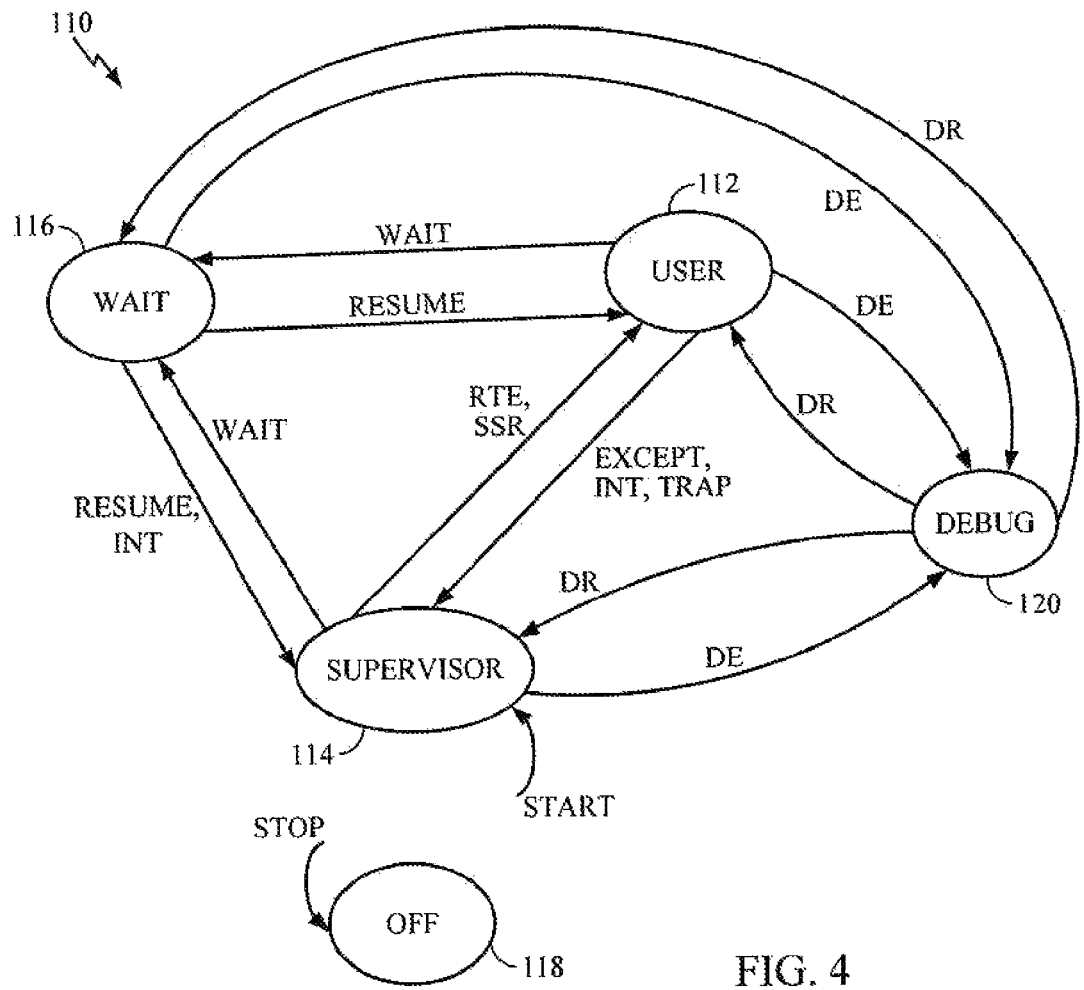
Figure 5:
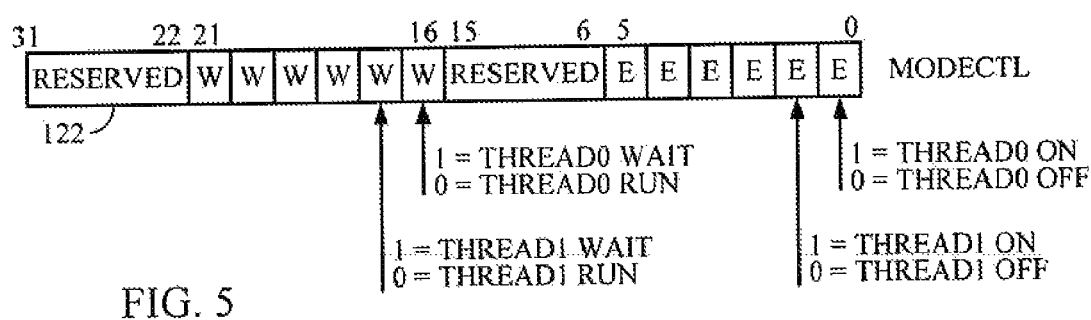
Figure 6:
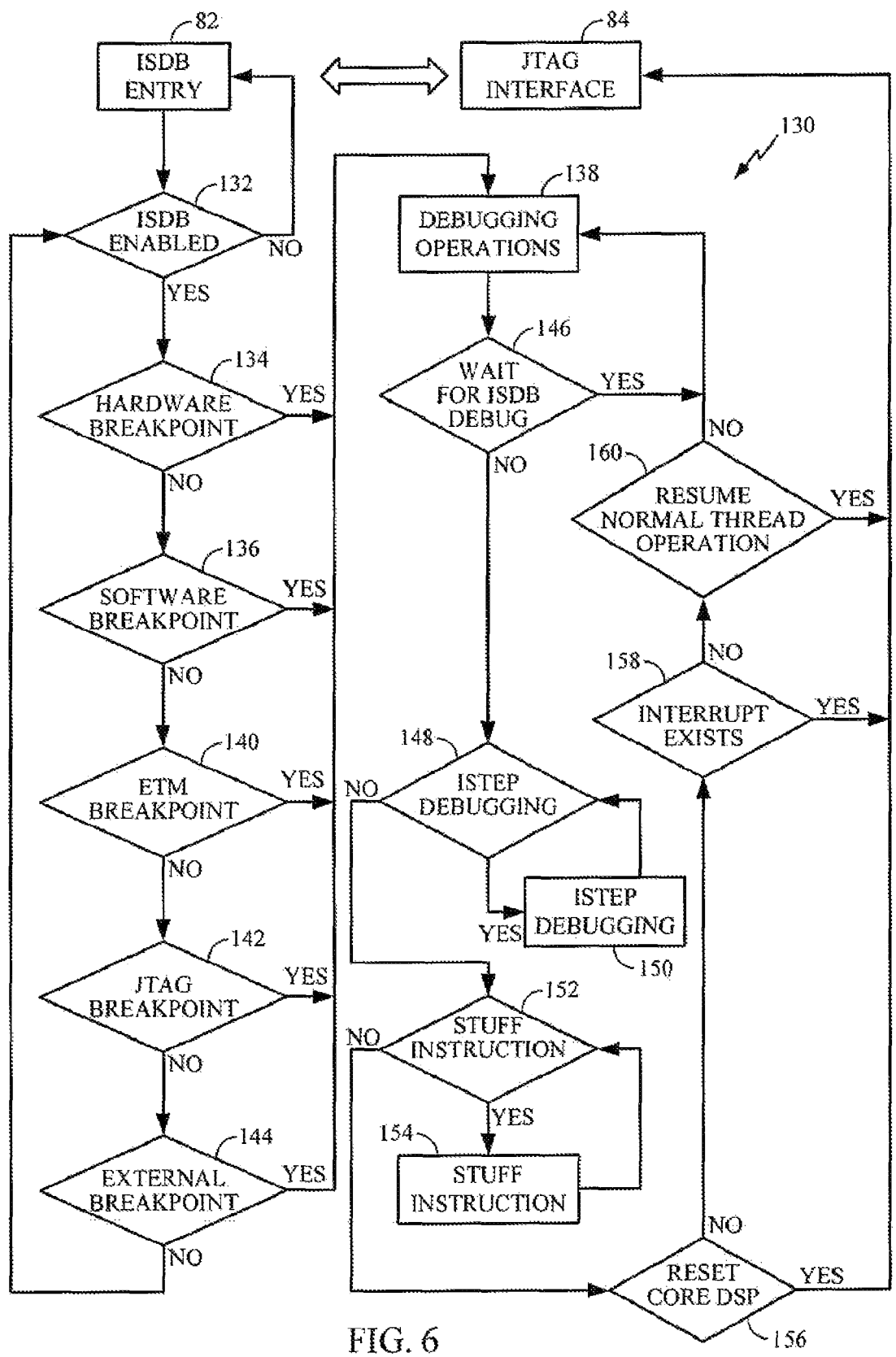

FIG. 3 provides an architecture block diagram of one embodiment of a digital signal processor providing the technical advantages of the disclosed subject matter;

FIG. 4 presents a functional block diagram of the mode control aspects of the present disclosure, include operations in a non-invasive debugging mode of operation;

FIG. 5 shows a mode control register for achieving the debugging operations of the present disclosure; and FIG. 6 shows a flow diagram for the various non-invasive debugging algorithm aspects of the present disclosure.

DETAILED DESCRIPTION OF THE SPECIFIC EMBODIMENTS

Figure 1:
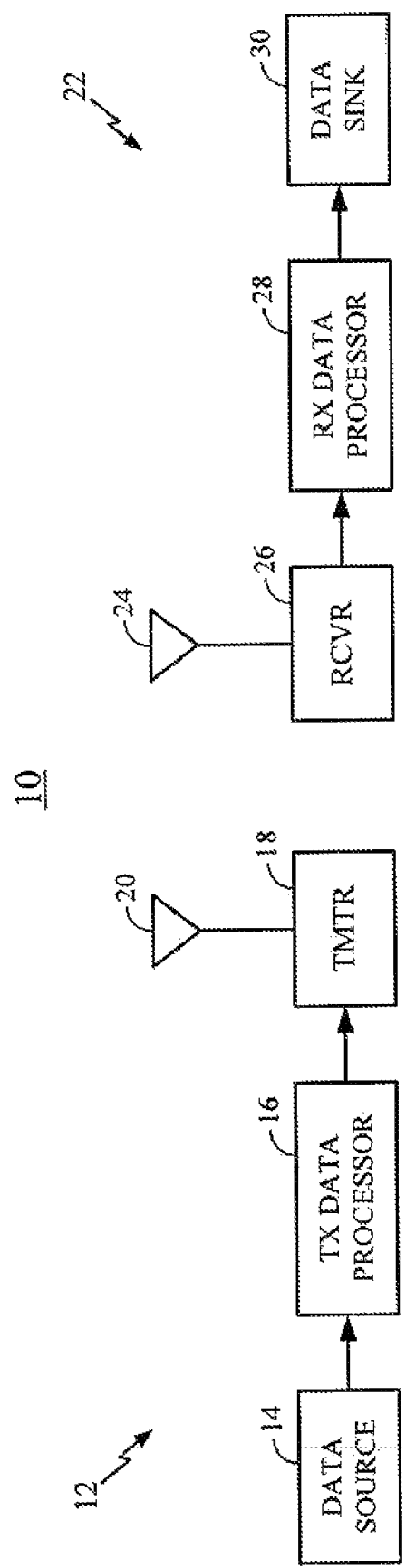
FIG. 1 is a simplified block diagram of a communications system that may implement the present embodiment.

The disclosed subject matter for a non-intrusive, thread-selective, debugging method and system for a multi-threaded digital signal processor has application for multi-threaded processing of any type for which the benefits here presented may be advantageous. One such application appears in telecommunications and, in particular, in wireless handsets that employ one or more digital signal processing circuits. For explaining how such a wireless handset may be used, FIG. 1 provides a simplified block diagram of a communications system 10 that may implement the presented embodiments of the disclosed interrupt processing method and system. At a transmitter unit 12, data is sent, typically in blocks, from a data source 14 to a transmit (TX) data processor 16 that formats, codes, and processes the data to generate one or more analog signals. The analog signals are then provided to a transmitter (TMTR) 18 that modulates, filters, amplifies, and up converts the baseband signals to generate a modulated signal. The modulated signal is then transmitted via an antenna 20 to one or more receiver units.

At a receiver unit 22, the transmitted signal is received by an antenna 24 and provided to a receiver (RCVR) 26. Within receiver 26, the received signal is amplified, filtered, down converted, demodulated, and digitized to generate in phase (I) and (Q) samples. The samples are then decoded and processed by receive (RX) data processor 28 to recover the transmitted data. The decoding and processing at receiver unit 22 are performed in a manner complementary to the coding and processing performed at transmitter unit 12. The recovered data is then provided to a data sink 30.

The signal processing described above supports transmissions of voice, video, packet data, messaging, and other types of communication in one direction. A bi-directional communications system supports two-way data transmission. However, the signal processing for the other direction is not shown in FIG. 1 for simplicity. Communications system 10 may be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA Standard.

Figure 2:
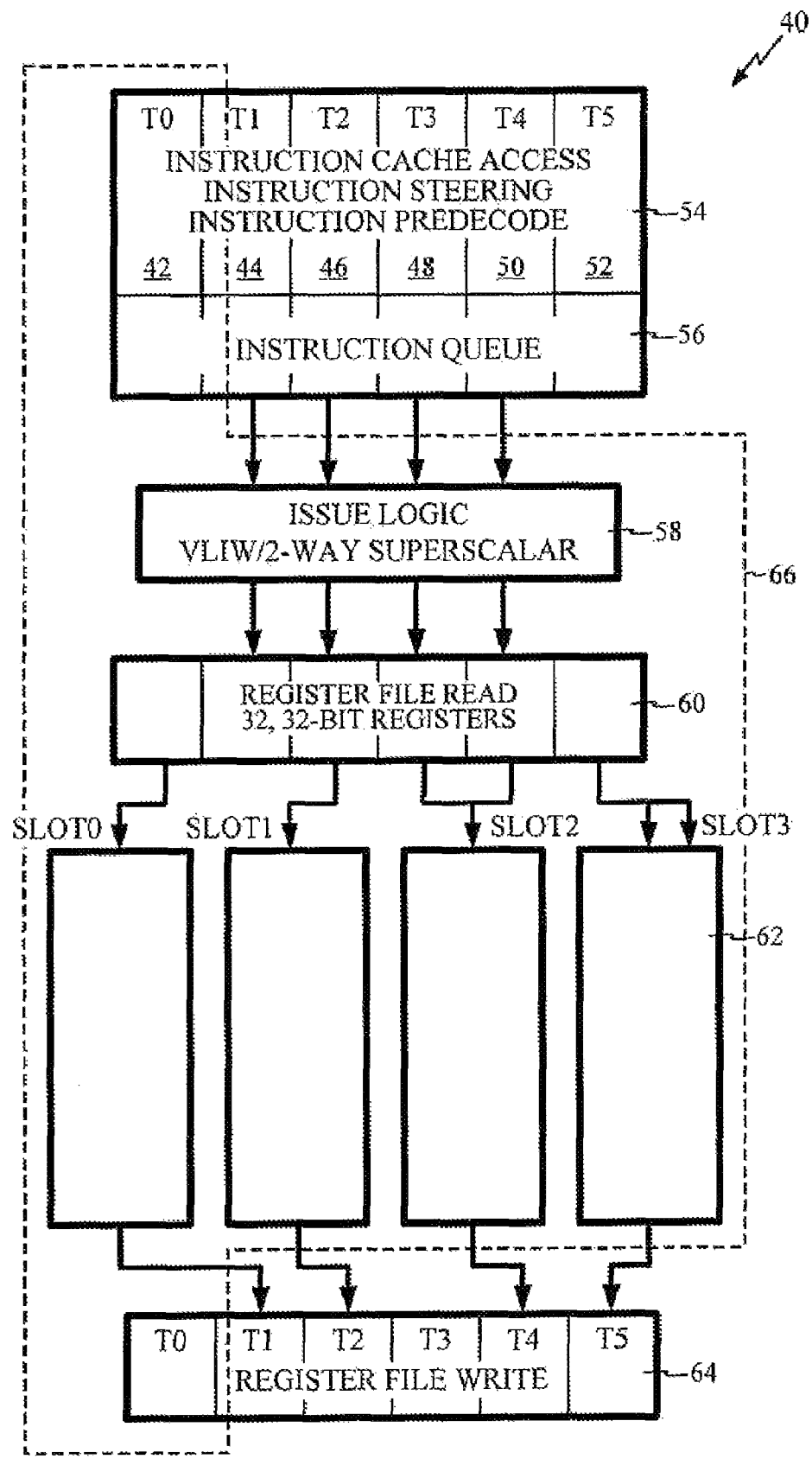
FIG. 2 illustrates a DSP architecture for carrying forth the teachings of the present embodiment.

FIG. 2 illustrates DSP 40 architecture that may serve as the transmit data processor 16 and receive data processor 28 of FIG. 1. We emphasize that DSP 40 only represents one embodiment among a great many of possible digital signal processor embodiments that may effectively use the teachings and concepts here presented. In DSP 40, therefore, threads T0:T5 (reference numerals 42 through 52), contain sets of instructions from different threads. Circuit 54 represents the instruction access mechanism and is used for fetching instructions for threads T0:T5. Instructions for circuit 54 are queued into instruction queue 56. Instructions in instruction queue 56 are ready to be issued into processor pipeline 66 (see below). From instruction queue 56, a single thread, e.g., thread T0, may be selected by issue logic circuit 58. Register file 60 of a selected thread is read and read data is sent to execution data paths 62 for SLOT0:SLOT3. SLOT0:SLOT3, in this example, provide for the packet grouping combination employed in the present embodiment.

Output from execution data paths 62 goes to register file write circuit 64, also configured to accommodate individual threads T0:T5, for returning the results from the operations of DSP 40. Thus, the data path from circuit 54 and before to register file write circuit 64 forms a processing pipeline 66. The present embodiment may employ a single processor with up to six threads, T0:T5. Processor pipeline 66 has six stages, matching the minimum number of processor cycles necessary to fetch a data item from circuit 54 to registers 60 and 64. DSP 40 concurrently executes instructions of different threads T0:T5 within a processor pipeline 66. That is, DSP 40 provides six independent program counters, an internal tagging mechanism to distinguish instructions of threads T0:T5 within processor pipeline 66, and a mechanism that triggers a thread switch.

DSP 40, therefore, provides a general-purpose digital signal processor designed for high-performance and low-power across a wide variety of signal, image, and video processing applications. FIG. 3 provides a brief overview of the DSP 40 architecture, including some aspects of the associated instruction set architecture for one manifestation of the disclosed subject matter. Implementations of the DSP 40 architecture support interleaved multithreading (IMT). In this execution model, the hardware supports concurrent execution of multiple hardware threads T0:T5 by interleaving instructions from different threads in the pipeline. This feature allows DSP 40 to include an aggressive clock frequency while still maintaining high core and memory utilization. IMT provides high throughput without the need for expensive compensation mechanisms such as out-of-order execution, extensive forwarding networks, and so on. Moreover, the DSP 40 may include variations of IMT, such as those variations and novel approaches disclosed in the commonly-assigned U.S. Patent Applications by M. Ahmed, et al, and entitled "Variable Interleaved Multithreaded Processor Method and System" and "Method and System for Variable Thread Allocation and Switching in a Multithreaded Processor."

FIG. 3, in particular, provides a core processing architecture 70 block diagram for DSP 40 as applied to a single thread that may employ the teachings of the disclosed subject matter. Block diagram 70 depicts shared instruction cache 72 which receives instructions via Bus interface (I/F) 73 from AXI Bus 74, which instructions include mixed 16-bit and 32-bit instructions. These instructions reach to sequencer 76, user control register 78, and supervisor control register 80 of threads T0:T5. The core-level system architecture of the disclosed subject matter also includes in-silicon debugging system (ISDB) 82, which interfaces core processor 70 via JTAG interface 84, both of which are described in more detail below.

Sequencer 76 provides hybrid two-way superscalar instructions and four-way VLIW instructions to S-Pipe unit 86, M-Pipe unit 88, LD[Load]-Pipe 90, and LD/ST[Store]-Pipe unit 92, all of which communicate with general registers 94. AXI Bus 74 also communicates via Bus I/F 73 with shared data cache 96 LD/ST instructions to threads T0:T5. Optional L2 Cache/TCM 98 signals include LD/ST instructions with shared data TCM 100, which LD/ST instructions further flow to threads General Registers 94. From AHB peripheral bus 102 MSM specific controller 104 communicates interrupts with T0:T5, including interrupt controller instructions, debugging instructions, and timing instructions. Global control registers 106 communicates control register instructions with threads T0:T5.

DSP 40, therefore, includes six virtual DSP cores, each containing global control registers 106 and private supervisor control registers 80. Global control registers 106 are shared between all threads. Each thread shares a common data cache and a common instruction cache. Load, store, and fetch operations are serviced by a common bus interface. High performance AXI bus 74 and a lower performance AHB bus 102 are used to connect the data and instruction traffic to off-core memory and peripherals. An integrated level two memory (cache and/or TCM) input 98 is optional. Peripheral access may be through memory-mapped loads and stores. The physical address partition between AHB and AXI may be configured at the MSM level.

Clearly, the presented architecture for DSP 40 may evolve and change over time. For example, the number of instruction caches that DSP 40 may use could change from six to one, or other numbers of caches. Superscalar dispatch, L1 data at TCM 100, and other architectural aspects may change. However, the present subject matter may have continued relevance in a wide variety of configurations and for a large family of modifications of DSP 40.

ISDB 82, through JTAG interface 84, provides a hardware debugger for DSP 40. ISDB 82 provides software debug features through JTAG interface 84 by sharing system or supervisor-only registers, that are divided into supervisor control registers 80 on a per thread basis, and global control registers 106 between all threads. The system control registers are used for per thread interrupt and exception control and per thread memory management activities. Global registers allow interacting with the ISDB 82 for debugging operations.

ISDB 82 enables software developers to debug their software while DSP 40 operates. ISDB 82 hardware, in combination with a software debugger program operating in ISDB 82, may be used to debug the DSP 40 operating system software. ISDB 82 supports debugging hardware threads individually. Users may suspend thread execution, view and alter thread registers, view and alter instruction and data memory, single step threads, stuff instructions to threads, and resume thread execution. Trusted users have access to all of ISDB 82 features, while untrusted users have access to one or more of features.

ISDB 82 may communicate with a debugger interface card to communicating with ISDB 82 debugging software residing on a program counter, all through JTAG interface 84. Host debugger software may interact with the ISDB 82 by reading and writing ISDB control registers. Communication, for example, may be through a 40-bit packet which identifies the ISDB register to which read/write is to occur, as well as a 32-bit data payload. A packet format supporting this operation may be up to 64 control registers which may be 32 bits wide each.

ISDB 82 includes a trusted register for controlling security during a debugging operation. If the ISDB 82 trusted is set, then all ISDB 82 registers are visible to the debugger software, and all ISDB commands are available for use. In the case that ISDB trusted is cleared, then ISDB 82 only permits a restricted set of operations.

Certain ISDB 82 registers may be made visible to core software. These are accessible via SUPERVISOR mode control register transfer instructions. The core instructions include a breakpoint instruction. When ISDB trusted is set, this instruction causes the executing thread to enter DEBUG mode 120. This transition shifts thread control to ISDB 82. In addition to the thread that executed a breakpoint, other threads may optionally enter DEBUG mode 120 according to ISDB 82 programming. If ISDB 82 is not trusted or not enabled, this instruction is treated as a NOP. Preferably, the breakpoint instruction is the only instruction in a packet.

FIG. 4 presents a processing mode diagram 110 for the various mode control aspects of DSP 40, including operations of ISDB 82 during debugging processes. FIG. 5 shows a mode control register 122 for achieving the debugging operations of the present disclosure. In one embodiment, mode control register 122 assists in the transitions to/from the disclosed operational modes includes a reserved section occupying bits 31 through 22; wait bits 21 through 16; reserved bits 16 through 6; and error bits 5 through 0. Although mode control register 122 may be implemented in many different ways, the illustrative embodiment of FIG. 5 may aid in understanding the following discussion of ISDB 82 including the various properties it possesses and operations it makes possible.

Now, referring to FIG. 4, DSP 40 supports processing modes that are both global to all threads and local to individual threads. Each DSP 40 hardware thread individually supports two execution modes, USER mode 112 and SUPERVISOR mode 114, and three non-processing modes o WAIT mode 116, OFF mode 118, and DEBUG mode 120, all as may appear in FIG. 4. The mode of a thread is independent of other threads, for example one thread may be in WAIT mode 116 while another is in USER mode 112, and so on. The per-thread mode state diagram of FIG. 4 is supported by various instructions or events. These include "Except" or internal exception event, an "Int" or external interrupt event, an "RTE" or software return instruction from exception mode, and "SSR" or update to SSR register instruction, a "Stop" or software stop instruction that may be entered from any mode, a "Start" or software start instruction that also may be entered from any mode, a "trap" or software trap instruction, a "Wait" or software wait instruction, a "Resume" or software resume instruction, a "DE" or debug event, and a "DR" or debug instruction. While the functions in different implementations of the claimed subject matter may vary slightly from those here presented, the meanings of "Start," "Wait," "Resume," "DE," and/or "DR" may be given their broadest interpretations consistent with the scope of the claimed subject matter.

Registers are available in DSP 40 in both USER mode 112 and SUPERVISOR mode 114. The user-mode registers are divided into a set of general registers and a set of control registers. General registers are used for all general purpose computation including address generation, scalar and vector arithmetic. Control registers support special-purpose functionality such as hardware loops, predicates, etc.

General purpose registers are 32 bits wide and may be accessed as single registers or as aligned pairs of two registers. The general register file provides all operands for instructions, including addresses for load/store, data operands for numeric instructions, and vector operands for vector instructions.

DSP 40 registers and instructions support efficient use of a software stack which employs standard C language conventions. The stack grows from high addresses towards low addresses. A stack pointer register points to the last valid element at the top of stack. Push operations first decrement the stack pointer and then write the data to the stack, while Pop operations read from the stack and then increment the stack pointer.

A procedure frame on the stack contains a return address for the function call and all local variables and data needed by the procedure. In addition, a frame pointer is stored after the return address. This frame pointer contains the address of the previous procedure frame on the stack. Its purpose is to facilitate debug by allowing a debugger to examine the stack in memory and easily determine the call sequence, function parameters, etc.

DEBUG mode 120 is a special state where the thread is waiting for commands from ISDB 82. Whenever an ISDB debug event occurs, such as by the execution of a software breakpoint instruction, a break command from ISDB 82, or occurrence of a hardware breakpoint, indicated threads may enter DEBUG mode 120. While in DEBUG mode 120, the core is controlled by ISDB 82 via commands from JTAG interface 84. When the ISDB 82 releases the thread due to execution of a resume command, the thread may resume operation according to their current mode settings. When a thread is in DEBUG mode 120, it is controlled by ISDB 82 and cannot be controlled by other threads. A Wait, Resume, Start, or Stop instruction from a running thread, targeting a thread in DEBUG mode 120, may be ignored. Similarly, a Non-Maskable Interrupt (NMI) may be ignored by threads in DEBUG mode 120.

A HARDWARE RESET mode (not shown) and DEBUG mode 120 are global to all threads. Whenever the hardware reset pin is asserted, regardless of any thread's processing state, DSP 40 may enter HARDWARE RESET Mode. In RESET mode, all registers are set to their reset values. No processing may occur until the hardware reset pin is de-asserted. When the reset pin is asserted, the processor may transition into reset mode and all registers may be reset to their reset values. After the reset pin is de-asserted, thread T0 may be given a soft reset interrupt. This may cause thread T0 to enter SUPERVISOR mode 114 and begin executing at the reset vector location. All other threads may remain off. At this point, the software is free to control mode transitions for each thread individually.

Each thread may have one transition bit in mode control register 122 that controls the transition to and from OFF mode 118 for that thread. Writing to the transition bit via the Stop instruction turns the associated thread OFF. Writing to the transition bit via the Start instruction turns the thread on and triggers a soft reset interrupt. Each thread may include one wait bit in mode control register 122 for controlling transitions to and from WAIT mode 116. Writing to wait bit via the wait instruction may idle the associated thread, while writing via the resume instruction may cause the thread to resume whatever it was doing before WAIT mode 116 was set.

Through the use of breakpoints, the six threads of DSP 40 may individually enter and exit DEBUG mode 120. A breakpoint trigger may come from five sources which correspond to the five different types of breakpoints supported in ISDB 82. These include hardware breakpoints, software breakpoints, ETM breakpoints, JTAG interface breakpoints, and external breakpoint. Upon hitting a breakpoint, a thread transitions from its current mode (e.g., WAIT/RUN) to DEBUG mode 120. In DEBUG mode 120, the thread waits for commands from ISDB 82. A thread in OFF mode 118 is powered down and may not accept any commands from ISDB 82. The latency of entering DEBUG mode 120 is implementation defined. For example, an implementation may choose to complete a given operation, for example finish an outstanding load request, before entering DEBUG mode 120. In one embodiment, a thread identifier register contains an 8-bit read/write field and is used for holding a software thread identifier. This field is used by the hardware debugger to match breakpoints.

There are a number of different ways to enter the breakpoint process. For example, there are two hardware breakpoints. In a register equals a predetermined value, then when the program counter (PC) matches the predetermined value, then the process goes into the DEBUG mode 120. In addition to PC there may other qualifiers, such as thread IDs such as address translations (physical address or virtual addresses). ASIDs are tags that are similar to processes IDs in a process or a particular thread in a multithreaded process. So, physical address, virtual address, ASID, PC, or other qualifiers may be used to optionally obtain a fix of the location of the program in a space of process.

ISDB 82 also defines two output interrupt pins. These signals go out of ISDB 82 into the MSM 104 and are strapped at the MSM level. The two signals are break event and JTAG interface 84 command. At the break event command, ISDB 82 may be programmed to raise this interrupt whenever a breakpoint occurs on an indicated thread number. At the JTAG interface 84 command, JTAG interface 84 sends a command to raise this interrupt.

A hardware breakpoint matches one or more of a threads program counter, ASID (Address Space Identifier), and thread identifier registers against ISDB programmed values. When the match conditions are met, the thread enters DEBUG mode 120. In addition to the thread that hit the breakpoint, other threads may be configured to enter DEBUG mode 120 as well. This may be achieved, for example, through breakpoint configuration register programming.

Hardware breakpoints may support various features, including, for example, matching a 32-bit program counter value, which may be physical or virtual, matching a 6-bit ASID value, match an 8-bit thread identifier value, and/or forcing other threads into DEBUG mode 120 upon hitting a breakpoint. To set a hardware breakpoint, the breakpoint program counter and breakpoint configuration registers may be set through JTAG interface 84 and then through use of the breakpoint enabled and configured via ISDB 82 configuration registers.

The disclosed subject matter also provides certain software breakpoints. For example, the user-level breakpoint instruction may be used to enter hardware DEBUG mode 120. When this instruction is executed, the core examines a system configuration ISDB trusted bit. If the ISDB trusted bit is set, then the thread may enter DEBUG mode 120. In the case that ISDB trusted is clear or ISDB is disabled, execution of the breakpoint instruction may be treated as a NOP. There is no restriction on the program counter address of a breakpoint instruction. However, breakpoint instructions cannot be packetized with other instructions.

The disclosed subject matter also provides for embedded trace macro or ETM breakpoints for initiating an ETM process which monitors the operation of the DSP 40 core processor. ETM supports a wide variety of trigger conditions. As such, linking hardware breakpoint to ETM breakpoint may occur when the breakpoint configuration is set for such a transition. Through the use of ETM (embedded trace map), ISDB 82 provides the ability to use a section of processor hardware that is adjacent to the processor for the purpose of monitoring processor operations. In addition, the disclosed subject matter provides the ability to link debugging operations on one or more threads to operations occurring on one or more other threads. For example, if one hardware thread hits a breakpoint, then the present disclosure permits starting or stopping processing in another thread. The present disclosure, therefore, provides for independently debugging any one thread or a set of threads, as well as the ability to control how events occurring on one thread or one set of threads may affect operations on one thread or set of threads.

So, the disclosed subject matter provides a path for moving into a DEBUG mode 120 in the event of a breakpoint causing entry into the DEBUG mode 120. The disclosed subject matter controls which thread or sets of threads in the multithreaded digital signal processor go into the DEBUG mode 120. ETM breakpoint debugging performs operations such as performance profiling that may be used for processor debugging. That block may provide a breakpoint for entering the debugging process.

In this situation, both a hardware breakpoint and a ETM breakpoint thread number MASK are enabled for the matching thread. In this instance, DSP 40 may switch to DEBUG mode 120 only when the hardware breakpoint is triggered following the ETM breakpoint. Any hardware breakpoint triggers that occur before the ETM breakpoint occurs may be ignored. When breakpoint configuration is set to '0' or not set, the hardware breakpoint and ETM breakpoint thread number MASK behave normally. That is, when enabled the corresponding breakpoint trigger may cause the thread(s) to switch to DEBUG mode 120 immediately.

The JTAG interface 84 breakpoint is triggered on an ISDB break command so that threads indicated in the command mask may enter DEBUG mode 120. ISDB 82 also supports multi-core debug through external breakpoints. Such a breakpoint is triggered when a rising edge is detected on the external debug request signal. Upon this event, all threads indicated in the external breakpoint thread number mask may enter DEBUG mode 120.

Another feature of the disclosed subject is termed "instruction stuffing." Instruction stuffing occurs when the host debugging process seeks to inspect the state of the core. Thus, when a breakpoint occurs, the process seeks to examine the core to determine that operations are occurring at the core. The mechanism to do that is to send over a processor instruction for the purpose of executing the instruction on the thread that is entering the DEBUG mode 120 of operation.

In the instruction stuffing operation, the instruction may direct the processor to read all or a portion of all affected registers at the time of the DEBUG mode 120. In addition, the DEBUG mode 120 may direct the processor to load a predetermined set or type of instructions. In addition reading and writing the state, essentially any instruction may be read or written to the core in this process. For example, if it is desirable to run some algorithm or process on the processor core, the disclosed subject matter now allows set of options. In the instruction stuffing process, a branch to a location and the process may then release the code for operation. Such code could include, for instance, code for performing certain functions for a specified set of reasons. One such reason may be to process a complicated data structure. If the instruction is to read out all elements of a given data structure, then the process could be to reconstruct the data structure. Such a process could be exceedingly difficult. With a set of instructions to read out the data structure, the process could be to call the set of instructions to obtain the specific instructions, then specific instruction could run to the desired element (e.g., element 12). This would significantly simplify many types of data retrieval and similar operations.

Instruction stuffing is a method for ISDB 82 to execute instructions on the core. Instructions are stuffed for various reasons, including, for reading and writing core registers and memory, for debugger operations abstracted for the user, and for user entered instructions. To stuff an instruction, the user must first program the stuff instruction register with the 32-bit instruction to be executed. For instruction stuffing, the ISDB command register may be written first by setting the command field to the stuff code, and then setting the thread number field to the thread to receive the instruction. The selected thread may be in DEBUG mode 120 before the instruction may be stuffed. If more than one bit in thread number is set or the selected thread is not in DEBUG mode 120, the results are undefined. Then, a phase involving setting the privilege level of the stuffed instructions (either user or supervisor) occurs.

After issuing the stuff command, the instruction may be executed on the chosen thread with the chosen privilege level. During instruction stuffing, the program counter does not advance. Stuffed instructions which use program counter (branches, or instructions that cause an exception) may use the thread's current program counter value. In the case that a stuffed instruction causes an exception, the ISDB status register may indicate that an exception occurred. The thread may remain in DEBUG mode 120. The thread's designed registers may reflect the exception state. Preferably, the ISDB 82 debugging software queries the ISDB status register after stuffing an instruction that could cause an exception to see if an exception occurred.

Once an exception has been recognized, the process here disclosed includes a number of choices as to how to handle the situation. For example, the debugger software could choose to program a software or hardware breakpoint at the exception return point and resume the thread in order to run the handler. Then, the debugger may redirect a thread to an OS "helper" function. Stepping through the handler using single-step and manually fix the problem (e.g., reload the TLB) may next occur. However, the specific strategy may differ according to the OS and/or software debugger implementation.

Registers, cache, and memory may be accessed by stuffing the appropriate instruction sequences. The sequence of steps for instructions may include reading/writing registers and cache using the ISDB debugging algorithms. The debugger software may read/write thread registers by stuffing the appropriate control register transfer instruction to move data between a core register and the ISDB mailbox. This instruction may be stuffed using supervisor privilege level to ensure no exception occurs.

The Resume command is used to transition threads from debug to the mode programmed in the core mode control register. There are two ways to resume, either from a JTAG interface 84 command or from an external signal. If resuming is from a JTAG interface 84 command, the threads indicated in the command mask that are in DEBUG mode 120 terminate to the mode indicated in the mode control register. If resuming is from an external signal, the threads indicated in the external resume thread number MASK that are in DEBUG mode 120 transition to the modes indicated in the mode control register.

Executing an ISDB Reset command forces a hardware reset and causes the entire DSP (all threads) to reset. This may set all registers to initial values, e.g., power off threads 1-5, and send a reset interrupt to thread T0. If it is desired to reset just certain threads, this may be done with a procedure of first stuffing a Start instruction with appropriate mask settings. This may cause a reset interrupt to be pending to the indicated threads. Then the process involves executing an ISDB resume instruction on the desired threads.

Another type of breakpoint is the JTAG interface 84 breakpoint wherein the host sends a command over to the processor and says break. There is essentially an external pin that goes in. In this embodiment, ISDB 82 control registers may be accessed by the debugger host software via JTAG interface 84. ISDB 82 provides various control registers which may be used by the host system to configure ISDB 82 to perform different debug tasks and communicate with the DSP 40 core processor. For example, an ISDB 82 status register indicates the current status of ISDB 82. Bits of the ISDB 82 status register indicate which threads are in "WAIT" vs. RUN mode and others indicate which threads are in "OFF" mode. They reflect the E bit field of the core mode control register. A thread that is OFF, for example, generally cannot be debugged. So, if ISDB commands are sent to a thread that is off, then the results are undefined. Other DEBUG mode 120 status bits indicate which threads are in DEBUG mode 120. If these bits indicate a thread is in DEBUG mode 120, then the WAIT/RUN mode bit indicates the mode prior to entering DEBUG mode 120.

Still other bits may indicate the stuff command status, i.e., whether the stuff instruction process has been successful or whether the stuff instruction caused an exception. An ISDB command status bit denotes whether the ISDB command was successful or failed. Another set of bits provide a global interrupt disable when any thread in DEBUG mode 120, such that interrupts are disabled for threads in DEBUG mode 120, enabled for other threads. Interrupts are disabled for all threads when any thread is in DEBUG mode 120.

Yet other bits may form a field that indicates which threads to resume upon external resume signal. Upon external resume signal, for threads which have the mask bit set, if that thread is in DEBUG mode 120, then it may resume its previous mode, otherwise there is no affect. Another field indicates which threads to break upon an external breakpoint request. Upon receiving in ISDB 82 an external breakpoint signal, for threads which have the mask bit set, if that thread is in not in DEBUG mode 120, then it may enter DEBUG mode 120, otherwise there is no affect.

Also, an ISDB configuration instruction may enable or disable various features of the ISDB 82. A global interrupt disable occurs when any thread in DEBUG mode 120 0, thereby disabling interrupts for threads in DEBUG mode 120. Another field in the ISDB configuration register may indicate which threads to resume upon external resume signal. Upon external resume signal, for threads which have the mask bit set, if such thread is in DEBUG mode 120, then the thread resumes its previous mode. Otherwise, there is no effect.

Yet another field in the ISDB register may indicate which threads to break upon ISDB 82 receiving an external breakpoint request. Upon receiving the external breakpoint signal, for threads which have the mask bit set, if the thread is not in DEBUG mode 120, then it may enter DEBUG mode 120. Otherwise, there is no effect.

A breakpoint information register indicates, for the threads in DEBUG mode 120, which trigger caused the breakpoint. This may be a 6-bit field indicating which additional threads to break upon a breakpoint instruction execution. The least-significant bit may be for thread number 0, the next bit for thread number 1, and so on. Upon breakpoint instruction execution, the thread that executed breakpoint may enter DEBUG mode 120. Additionally, the threads which have a bit set in this mask may enter DEBUG mode 120.

There is an interrupt signal break event which goes from ISDB 82 to the MSM. Whenever a thread number indicated in this mask goes into DEBUG mode 120, the break event interrupt is raised. In one embodiment, bit 0 is for thread number 0, bit 1 for thread number 1, etc. For threads in DEBUG mode 120, these bits indicate what caused the transition to DEBUG mode 120. For threads not in DEBUG mode 120, these bits are undefined. So, bits indicate the presence of a hardware breakpoint, a breakpoint instruction execution, an ETM breakpoint, a JTAG interface 84 breakpoint, an external breakpoint. Also, other bits may indicate the breakpoint source. A breakpoint program counter includes registers that are identical to breakpoint program counters, except that they control hardware breakpoints. Breakpoint configuration registers are used to compare against a thread's program counter register.

An ISDB 82 command register may include a break command for indicating which threads may transition to DEBUG mode 120. For resume command, for indicating which threads to resume. An ISTEP command indicates which threads to step in a step-by-step process. A stuff instruction command indicates which thread may receive the stuff instruction for performing instruction stuffing operations. Stuff instruction privileges allow some stuffed instructions to execute in USER mode, while others may execute in SUPERVISOR mode.

On a break command, DSP 40 may transition all threads indicated in the thread number mask to DEBUG mode 120. The resume command causes the processor to transition all threads indicated in the thread number mask to RUN mode. A step command allows the digital signal processor to step all threads indicated in the thread number mask for one packet. If the indicated threads are not in DEBUG mode 120, there is no effect.

A stuff command causes the digital signal processor to execute the 32-bit instruction contained in the stuff instruction register on the thread indicated in the thread number mask. Only one bit in the mask may be set. If the indicated thread is not in DEBUG mode 120, the behavior is undefined. The reset command initiates a hardware reset to the DSP. Registers are set to their initial values, threads 1 through 5 are turned off, and thread T0 is given a reset interrupt. On the interrupt command, the ISDB 82 raises the JTAG interface 84 command interrupt. This signal goes out of ISDB 82 into MSM 104 and is strapped at the MSM level. An ISDB 82 enable register enables ISDB 82 operation and also checks the status of the "security" ISDB 82 enable bit and the ISDB 82 clock.

Having addressed the various commands supporting the operation of ISDB 82, an exemplary process of ISDB 82 debugging operations may be further instructive. Accordingly, FIG. 6 shows an ISDB 82 flow diagram for the various non-invasive debugging algorithm aspects of the present disclosure. Although the ISDB 82 process flow of FIG. 6 may be performed using a variety of approaches, the basic flow of the disclosed subject matter as presented achieves the desired non-intrusive debugging operations. So, referring to FIG. 6, from JTAG interface 84, at ISDB entry step 130 process flow may begin.

From ISDB entry step 130, non-intrusive debugging process flow may proceed to ISDB enabled query 132 which tests whether ISDB has been enabled for DSP 40 operation. If so, then process flow goes to hardware breakpoint query 134. Hardware breakpoint query 134 tests whether a hardware breakpoint has been encountered. If not, then process flow may continue to software breakpoint query 136. Otherwise, process flow goes to debugging operations step 138 at which debugging operations begin. Software breakpoint 136 tests for the presence of a software breakpoint and directs the ISDB 82 process to debugging operations step 138 in the event that a software breakpoint is present. Otherwise, process flow continues to ETM breakpoint query 140. ETM breakpoint 140 tests for the presence of an ETM breakpoint and directs the ISDB 82 process to debugging operations step 138 in the event that an ETM breakpoint is present. Otherwise, process flow continues to JTAG interface 84 breakpoint query 142. JTAG interface 84 breakpoint 142 tests for the presence of a JTAG interface 84 breakpoint and directs the ISDB 82 process to debugging operations step 138 in the event that a JTAB breakpoint is present. Otherwise, process flow continues to external breakpoint query 144. External breakpoint 144 tests for the presence of an external breakpoint and directs the ISDB 82 process to debugging operations step 138 in the event that an external breakpoint is present. Otherwise, process flow returns to ISDB enabled query 132. This type of cycle may be repeated during the operation of DSP 40.

Once ISDB 82 process flow goes to debugging operations step 138, a "wait for debug" query 146 tests whether WAIT mode 116 is effective. If so, then until the WAIT 116 mode terminates, debugging operations do not yet occur. If WAIT mode 116 is not effective, then process flow goes to ISTEP debugging query 148. ISTEP debugging query 148 tests whether individual step debugging is effective for ISDB 82 operations. If so, then process flow goes to ISTEP debugging step 150 to perform this type of debugging operation. If ISTEP debugging is not effective, then process flow may go to stuff instruction query 152. Stuff instruction query 152 tests whether instruction stuffing operations are effective for ISDB 82 operations. If so, then process flow may proceed to stuff instruction step 154, representing the instruction stuffing operations here described. If instruction stuffing is not effective, then process flow goes to query 156.

At query 156 a test occurs of whether a core DSP 40 reset instruction has been generated by debugging operations. If so, process flow goes to JTAG interface 84 for delivering the core DSP 40 digital signal processor reset command. If no such reset command has been generated, then process flow goes to interrupts exist query 158. Interrupts exist query 158 tests whether an interrupt to the debugging operations exists. If so, then ISDB 82 operations are interrupted and process flow goes to JTAG interface 84 for delivering to DSP 40 the signal that debugging operations have been so interrupted. If no interrupt signal exists, then process flow goes to resume normal thread query 160 for testing whether normal thread operation are to begin and debugging operations are to cease. If so, then process flow goes to JTAG interface 84, DSP 40 transitions the affected threads from the DEBUG mode 120 of operation to the normal mode of operation. If debugging operations are to continue, then process flow returns to debugging operations step 138.

Clearly, operations of ISDB 82 process flow may vary widely and yet be within the scope of the disclosed subject matter. Accordingly, ISDB 82 process flow of FIG. 6 is provided for illustrative purposes as one possible embodiment of the present disclosure.

Another aspect of the disclosed subject matter includes debugging through a power collapse in DSP 40. The ISDB configuration registers are readable and writeable by both the debugger software (via JTAG interface 84) and by supervisor core software (via CR transfer instructions). Kernel software may use this feature to save and restore the ISDB configuration over power collapse. Because there are multiple masters writing these shared registers, it is important to only write them in a consistent and mutually exclusive fashion.

The policy is that while the core is in the process of powering down or powering up, the JTAG interface 84 is not allowed to read/write these registers. Similarly, when the JTAG interface 84 is in the process of modifying these registers, the core is not allowed to power down. This policy is enforced through a combination of hardware and software. A bit in system configuration, an ISDB core ready register bit may be written only by core supervisor software. This bit is cleared on hardware reset of DSP 40. When the bit is clear, all JTAG interface 84 read and write packets may return an invalid status. Using this bit, the core may indicate to the host software when it has completed the power up sequence and is ready to talk to the ISDB. This gives the core an opportunity to restore any saved ISDB 82 configuration in warm boot power up (restore) sequences.

One example of debugging through power collapse may exist in a cell phone, where there is the need to be power conscious. DSP 40 may go off or idle while there is yet the need to perform debugging. The disclosed subject matter, therefore, provides the ability to set a breakpoint that may manifest itself only in the power collapse instance. This provides the ability to debug, even when the core is not even operating or "on."

Debugging through power collapse, in the disclosed embodiment, includes setting a set of breakpoints for configurations associated with the DSP dropping power. Before the DSP drops power, the DSP saves off the configurations in specific registers. These specific registers and configurations allow a suspend to RAM process. So, when the DSP comes back up, the configuration is in a position to perform the next debug operation.

The processing features and functions described herein for non-intrusive, thread-selective, debugging in a multi-threaded digital signal digital signal processor may be implemented in various manners. For example, not only may DSP 40 perform the above-described operations, but also the present embodiments may be implemented in an application specific integrated circuit (ASIC), a microcontroller, a digital signal processor, or other electronic circuits designed to perform the functions described herein. Moreover, the process and features here described may be stored in magnetic, optical, or other recording media for reading and execution by such various signal and instruction processing systems. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A non-intrusive method for debugging a multi-threaded digital signal processor, comprising:
   executing a plurality of processing instructions by a plurality of threads in the multi-threaded digital signal processor;
   identifying one or more breakpoint instructions for generating at least one debugging event for one or more indicated threads of the plurality of threads;
   receiving the one or more breakpoint instructions at an in-silicon debugging system (ISDB) of the multi-threaded digital signal processor;
   reading a register of the ISDB to determine the one or more indicated threads corresponding to the one or more breakpoint instructions;
   generating the at least one debugging event for the one or more indicated threads in response to executing at least one of the one or more breakpoint instructions;
   executing a plurality of debugging instructions in response to the at least one debugging event, the debugging instructions for non-intrusively debugging the executing of the plurality of the processing instructions in the multi-threaded digital signal processor by transitioning the one or more indicated threads of the multi-threaded digital signal processor into a debugging mode; and
   generating at least one debugging return from the executing of the plurality of debugging instructions for reporting the executing of the plurality of debugging instructions.

2. The method of claim 1, wherein the at least one debugging event occurs in response to an internally generated instance within the multi-threaded digital signal processor.

3. The method of claim 1, wherein the at least one debugging event occurs in response to an externally generated instance within the multi-threaded digital signal processor.

4. The method of claim 1, wherein the at least one debugging event occurs in response to a program counter reaching a predetermined count within the multi-threaded digital signal processor.

5. The method of claim 1, wherein the one or more indicated threads of the multi-threaded digital signal processor transition out of the debugging mode.

6. The method of claim 1, wherein at least one or more instruction stuffing instructions perform a predetermined debugging algorithm relating to operation of the multi-threaded digital signal processor.

7. The method of claim 1, wherein at least one of the debugging instructions in the multi-threaded digital signal processor uses a Joint Test Action Group (JTAG) interface between the executing of the plurality of debugging instructions and the executing of the plurality of processing instructions.

8. A system for non-intrusively debugging a multi-threaded digital signal processor, comprising:
   a plurality of threads for executing a plurality of processing instructions in the multi-threaded digital signal processor;
   a set of breakpoint instructions for generating at least one debugging event for one or more indicated threads of the plurality of threads;
   an in-silicon debugging system (ISDB) of the multi-threaded digital signal processor for receiving the set of breakpoint instructions;
   a register of the ISDB for determining the one or more indicated threads corresponding to the set of breakpoint instructions;
   debugging event generating instructions for generating the at least one debugging event for the one or more indicated threads in response to executing at least one of the breakpoint instructions;
   one or more of the threads for executing the plurality of debugging instructions in response to the at least one debugging event, the plurality of debugging instructions for non-intrusively debugging the executing of the plurality of processing instructions in the multi-threaded digital signal processor by transitioning the one or more indicated threads of the multi-threaded digital signal processor into a debugging mode; and
   debugging return instructions for generating at least one debugging return from the executing of the plurality of debugging instructions for reporting the executing of the plurality of debugging instructions in the one or more indicated threads of the multi-threaded digital signal processor.

9. The system of claim 8, further comprising circuitry and instructions for the at least one debugging event to occur in response to a program counter reaching a predetermined count within the multi-threaded digital signal processor.

10. The system of claim 8, further comprising circuitry and instructions for transitioning the one or more indicated threads of the multi-threaded digital signal processor out of the debugging mode.

11. The system of claim 8, further comprises a set of instruction stuffing instructions for performing a predetermined debugging algorithm relating to operation of the multi-threaded digital signal processor.

12. The system of claim 8, further comprising circuitry and instructions for non-intrusively debugging the multi-threaded digital signal processor using a Joint Test Action Group (JTAG) interface.

13. A non-transient computer usable medium having computer readable program code embodied therein for processing instructions on a multi-threaded digital signal processor for non-intrusively debugging the multi-threaded digital signal processor, the computer usable medium comprising:
  computer readable program code for executing a plurality of processing instructions using a plurality of threads in the multi-threaded digital signal processor;
  computer readable program code for identifying one or more breakpoint instructions for generating at least one debugging event for one or more indicated threads of the plurality of threads;
  computer readable program code for reading a register of an in-silicon debugging system (ISDB) to determine the one or more indicated threads, wherein the one or more indicated threads are each identified in the register by a mask bit;
  computer readable program code for generating the at least one debugging event for the one or more indicated threads in response to executing at least one of the one or more breakpoint instructions;
  computer readable program code for executing the plurality of debugging instructions in response to the at least one debugging event, the debugging instructions for non-intrusively debugging the executing of the plurality of processing instructions in the multi-threaded digital signal processor by transitioning the one or more indicated threads of the multi-threaded digital signal processor into a debugging mode; and
  computer readable program code for generating at least one debugging return from the executing of the plurality of debugging instructions for reporting the executing of the plurality of debugging instructions in the one or more indicated threads of the multi-threaded digital signal processor.

14. The non-transient computer usable medium of claim 13, further comprising computer readable program code for executing the plurality of debugging instructions in response to the at least one debugging event, the at least one debugging event occurring in response to an internally generated instance within the multi-threaded digital signal processor.

15. The method of claim 1, wherein the one or more indicated threads are indicated by a mask.

16. The method of claim 1, wherein other threads of the plurality of threads are not affected by executing the at least one of the one or more breakpoint instructions.

17. The method of claim 15, wherein the mask includes a mask bit stored at the register.

18. The system of claim 8, wherein the one or more indicated threads are indicated by a mask.

19. The system of claim 8, wherein other threads of the plurality of threads are not affected by executing the set of breakpoint instructions.

20. The system of claim 19, wherein the one or more indicated threads are each identified in the register by a mask bit.

21. The non-transient computer usable medium of claim 13, wherein other threads of the plurality of threads are not affected by executing the at least one of the one or more breakpoint instructions.

22. A system to non-intrusively debug a multi-threaded digital signal processor, comprising:
  a plurality of threads to execute a plurality of processing instructions at the multi-threaded digital signal processor;
  a set of breakpoint instructions to generate at least one debugging event associated with one or more indicated threads of the plurality of threads, wherein the one or more indicated threads are indicated by a mask;
  debugging instructions to generate the at least one debugging event for the one or more indicated threads in response to executing at least one of the breakpoint instructions;
  one or more of the plurality of threads to execute the debugging instructions in response to the at least one debugging event, the debugging instructions to non-intrusively debug execution of the plurality of processing instructions at the multi-threaded digital signal processor by transitioning the one or more indicated threads of the multi-threaded digital signal processor into a debugging mode;
  debugging return instructions to generate at least one debugging return from the execution of the plurality of debugging instructions and to report the execution of the plurality of debugging instructions in the one or more indicated threads at the multi-threaded digital signal processor; and
  an in-silicon debugging system (ISDB) to receive the at least one of the breakpoint instructions, wherein the at least one of the breakpoint instructions is treated as a no-operation (NOP) in response to determining that the ISDB is not trusted, that the ISDB is not enabled, or a combination thereof.

23. An apparatus comprising:
means for executing a plurality of processing instructions using a plurality of threads of a multi-threaded digital signal processor;
means for identifying one or more breakpoint instructions for generating at least one debugging event for one or more indicated threads of the plurality of threads;
means for reading a register of an in-silicon debugging system (ISDB) to determine the one or more indicated threads, wherein the one or more indicated threads are each identified in the register by a mask bit;
means for generating the at least one debugging event for the one or more indicated threads in response to executing at least one of the one or more breakpoint instructions;
means for executing a plurality of debugging instructions in response to the at least one debugging event, the debugging instructions for non-intrusively debugging the executing of the plurality of processing instructions in the multi-threaded digital signal processor by transitioning the one or more indicated threads of the multi-threaded digital signal processor into a debugging mode; and
means for generating at least one debugging return from the executing of the plurality of debugging instructions for reporting the executing of the plurality of debugging instructions in the one or more indicated threads of the multi-threaded digital signal processor.

24. The apparatus of claim 23, incorporated into a wireless handset.

* * * * *